(12) United States Patent
Hamlin et al.

(10) Patent No.: US 10,402,556 B2
(45) Date of Patent: Sep. 3, 2019

(54) INFORMATION HANDLING SYSTEM DISPLAY SECURITY ACCESS THROUGH TOTEM INTERACTIONS

(71) Applicant: Dell Products L.P., Round Rock, TX (US)

(72) Inventors: Daniel L. Hamlin, Round Rock, TX (US); Yagiz C. Yildiz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 15/478,315

(22) Filed: Apr. 4, 2017

(65) Prior Publication Data
US 2018/0285548 A1 Oct. 4, 2018

(51) Int. Cl.
*G06F 21/36* (2013.01)
*G06F 21/40* (2013.01)
*G06F 21/31* (2013.01)
G06F 21/30 (2013.01)
G06F 21/62 (2013.01)

(52) U.S. Cl.
CPC ............ *G06F 21/36* (2013.01); *G06F 21/31* (2013.01); *G06F 21/40* (2013.01); *G06F 21/30* (2013.01); *G06F 21/62* (2013.01)

(58) Field of Classification Search
CPC .......... G06F 21/36; G06F 21/40; G06F 21/30; G06F 21/31; G06F 21/62
See application file for complete search history.

(56) References Cited

U.S. PATENT DOCUMENTS

| 2012/0194447 A1* | 8/2012 | Lin ..................... G06F 3/04883 345/173 |
| 2013/0174252 A1* | 7/2013 | Weber ................. G06F 21/6218 726/20 |
| 2015/0066762 A1* | 3/2015 | Chatterton ............ G06Q 20/40 705/44 |

* cited by examiner

*Primary Examiner* — Ayoub Alata
(74) *Attorney, Agent, or Firm* — Zagorin Cave LLP; Robert W. Holland

(57) ABSTRACT

An information handling system security system presents a combination lock user interface at a display with numbers depicted at a perimeter of a totem placed on the display. Rotational movement of the totem relative to the perimeter selects security code inputs to unlock access to the information handling system. Random placement of the numbers at the perimeter and totem unique values provide additional security that help prevent hacking of the security code through mimicking of inputs actions by an unauthorized observer.

20 Claims, 3 Drawing Sheets

INFORMATION HANDLING SYSTEM DISPLAY SECURITY ACCESS THROUGH TOTEM INTERACTIONS

BACKGROUND OF THE INVENTION

Field of the Invention

The present invention relates in general to the field of information handling system security, and more particularly to an information handling system display security access through totem interactions.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often store sensitive information of great value to individuals, enterprises and thieves. Typically information handling systems include passwords that protect against unauthorized access of stored information. End users often have a password that is required to access an operating system and another for information stored in persistent storage devices, such as hard disk drives and solid state drives. In addition, separate passwords protect access to particular applications and websites. Although requiring multiple passwords seems on its face to increase security, in truth the weak link is often that the many passwords prove too difficult for an end user to track. End users have difficulty remembering long, secure and strong passwords and sometimes instead opt for short and familiar passwords that hackers can guess. Further, effective passwords often prove difficult to input at portable information handling system devices that do not have physical keyboards, such as smartphones and tablets. Often users pick shorter passwords that are easy to break or simple geometric patterns that are easy to copy once seen by an unauthorized individual. In some instances, touch interfaces leave smudges where a password was entered that simplifies the task of an unauthorized individual in hacking the password or geometric pattern.

To aid device security, manufacturers have added additional physical devices for end users to secure information handling systems. One example is biometric security systems that scan fingerprints, iris prints and facial features to identify authorized users. Biometric security systems tend to increase system cost, are in many cases readily tricked and generally act as an equal alternative to password protection rather than an additional security measure. That is, an end user has the option of using biometrics or the password, which leaves the problem of short and simple passwords available for unauthorized individuals to hack. In addition, biometric systems do not integrate well with horizontal workspaces that have thick cover glass, such as the 2 mm glass found in horizontal display devices. Another example of a physical security device is protected personal identification numbers (PINs) integrated with hardware elements, such as that offered by Intel. The Intel protected PIN provides a randomized 1-10 digit long protected display authentication method which randomizes the location of inputs with logic running on a graphics controller to provide an increased number of authentication combinations and variations. Specialized hardware increases security by offering greater control at a system level of security measure implementations, however, specialized hardware creates support problems as hardware versions change over time and as different hardware may be included in a given production model.

SUMMARY OF THE INVENTION

Therefore, a need has arisen for a system and method which provide an information handling system display security access through totem interactions.

In accordance with the present invention, a system and method are provided which substantially reduce the disadvantages and problems associated with previous methods and systems for providing security through an information handling system display. A user interface presented on a display provides security code inputs without leaving repeatable touch marks on the display by presenting the security code input symbols in a selected of plural random arrangements, such as a combination lock having numbers around a perimeter and a randomly selected number in a top position. In one embodiment, a totem device placed on the display initiates a combination lock user interface that generates inputs based upon rotational motion of the totem.

More specifically, an information handling system processes information with a processor and memory for presentation at a display through a graphics processor. A security module executing on the information handling system restricts access to the operating system, applications and/or files of the information handling system until a security code is input by an end user. Upon detection of an access attempt by an end user, the security module presents a user interface at the display that accepts a security code to authorize access. The user interface presents symbols, such as numbers and/or letters in a selected of plural orders to ensure that input locations for a given security code at a display will vary on different access attempts by an end user. In one embodiment, the security module presents a combination lock user interface in response to placement of totem on the display, such as by presenting numbers at the perimeter of the totem. Number inputs are selected by rotating the totem to move the totem, input location and or numbers relative to each other for selection of security code input values. For example, number value inputs are selected by rotation of the totem in an opposite direction with selection of the number value based upon the location of a totem orientation relative to a number value or a number value relative to a user interface location when an opposing rotational movement is detected.

The present invention provides a number of important technical advantages. One example of an important technical advantage is that randomized password input placement implemented through a totem interaction provides secure access that is difficult to mimic from observation by an unauthorized individual. Totem placement to accept password inputs avoids smudges on the display that an unauthorized individual can attempt to retrace. Randomized presentation of the input values further reduces the risk of hacking in the event the access user interface is activated without totem use. In the event a totem device includes additional identifying information, such as Bluetooth identifier or unique foot placement, additional security measures may be associated with totem implementation. The security solution adapts by software modification to different platforms, password types and interfaces to scale across multiple types of data security usage models without integration of specialized hardware.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system security access code input through a combination lock user interface provides randomized input locations difficult for an unauthorized observer to mimic. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
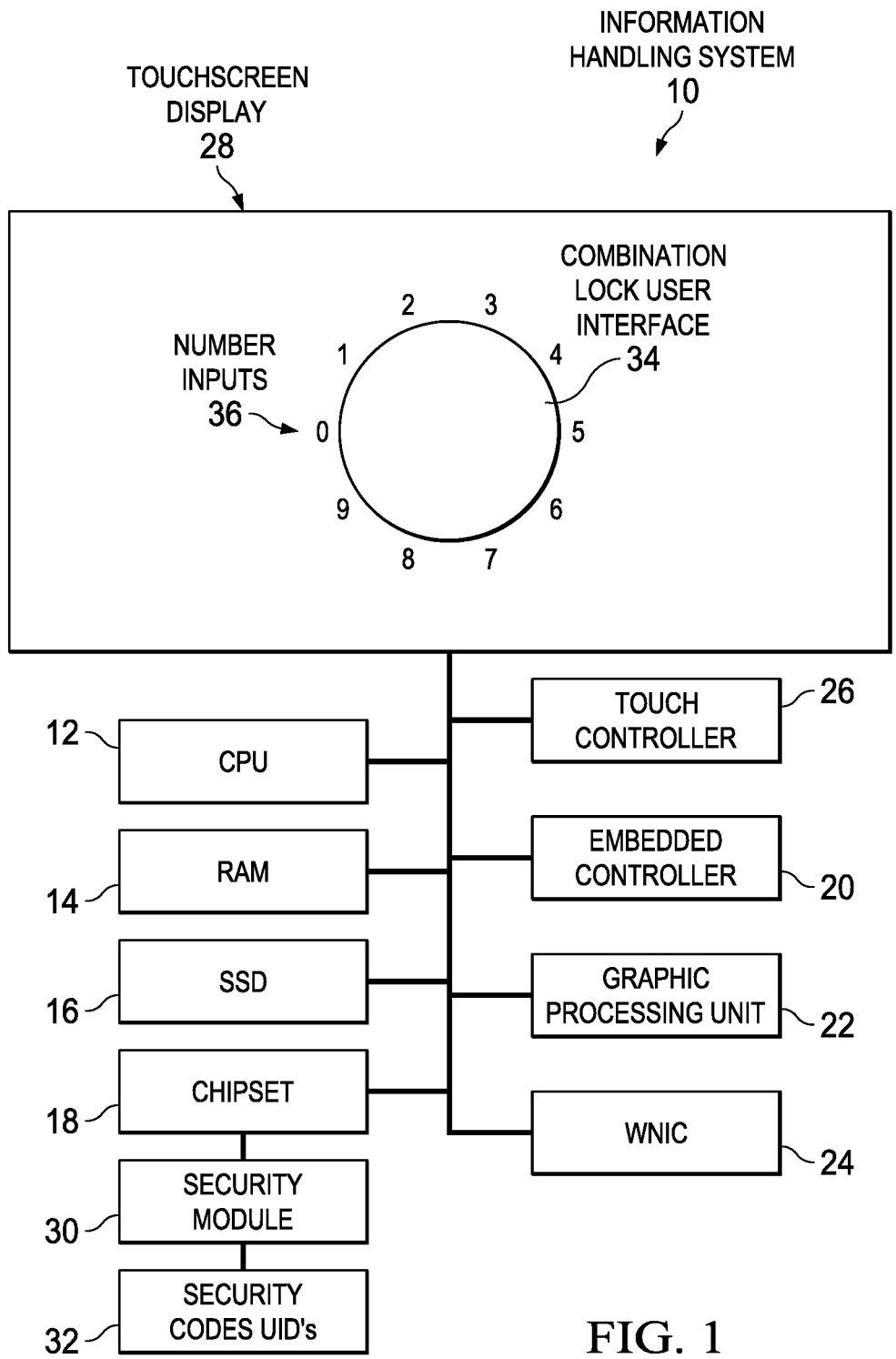
FIG. 1 depicts a block diagram of an information handling system having a totem combination lock secure access user interface.

Referring now to FIG. 1, a block diagram depicts an information handling system 10 having a totem combination lock secure access user interface 34. Information handling system 10 processes information with processing resources, such as central processing unit (CPU) 12 that executes instructions and random access memory (RAM) 14 that stores information. For example, CPU 12 executes an operating system and applications that run over the operating system, with the operating system and applications retrieve from persistent storage, such as a solid state drive 16. End user interactions are managed with controllers that execute embedded code at a chipset 18, such as to manage inputs, outputs and communication interfaces. In the example embodiment, an embedded controller 20 interfaced with chipset 18 manages system power and interactions with external peripherals, such a keyboard and mouse. A graphics processing unit (GPU) 22 accepts visual information generated by CPU 12 and converts the visual information into pixel values for presentation at a touchscreen display 28. A touch controller 26 interfaced with touchscreen display 28 accepts touch inputs detected at the display surface for communication to embedded controller 20 and/or CPU 12 as inputs. Other types of communication interfaces include wireless interfaces supported by a wireless network interface card (WNIC) 24, such a WiFi and Bluetooth interfaces.

In order to protect information stored on information handling system 10, a security module 30 prevents access to information unless an end user first provides a security code and or unique identifier 32. Security module 30 may be executed on CPU 12 as part of the operating system, on a chipset 18 controller as embedded code, and/or as part of a dedicated trusted information management system. Further, security codes may protect access to the information handling system as a whole, to particular applications and/or to particular files stored on information handling system 10. Security codes and unique identifiers 32 include number and/or symbol values selected by an end user or an administrator, such as passwords, personal identification numbers, MAC addresses, IP addresses or other external wireless codes that indicate the presence of a particular wireless device, like a Bluetooth unique identifier. As an example, a security code may provide access to an WINDOWS operating system welcome screen, such as the screensaver that protects access to the information handling system after a timeout indicates nonuse of the system for a defined time period.

In the example embodiment depicted by FIG. 1, a combination lock user interface 34 is presented at touchscreen display 34 with number inputs of 0-9 at a perimeter of the user interface. A security code is entered to security module 30 by rotating the user interface relative to number inputs 36 to select numbers of the security code that protects information handling system 10. Advantageously, numbers 36 are presented at random locations of display 28 when a number is input as a security code so that an unauthorized end user would have difficulty mimicking input motions of an authorized end user. Random locations at input selection may be accomplished in several ways. In one embodiment, user interface 34 is presented at random locations of display 28 at each access. As another example, numbers 36 are presented in numerical order having a different number located at a top position so that motion of user interface 34 relative to the numbers results in different rotational positions for the number value selections. Alternatively, numbers 36 rotate with user interface 34 to a marker that defines the selected value where the marker is located at a random position around the perimeter of user interface 34. For example, user interface 34 mimics the inputs of a mechanical combination lock by selecting input values at a change of rotational direction where the value selected at the change of direction is indicated with a marker location at a random rotational orientation, such as by highlighting the selected number. In this manner, smudges or marks left on display 28 by the input value selection will not relate to subsequent input positions.

Figure 2:
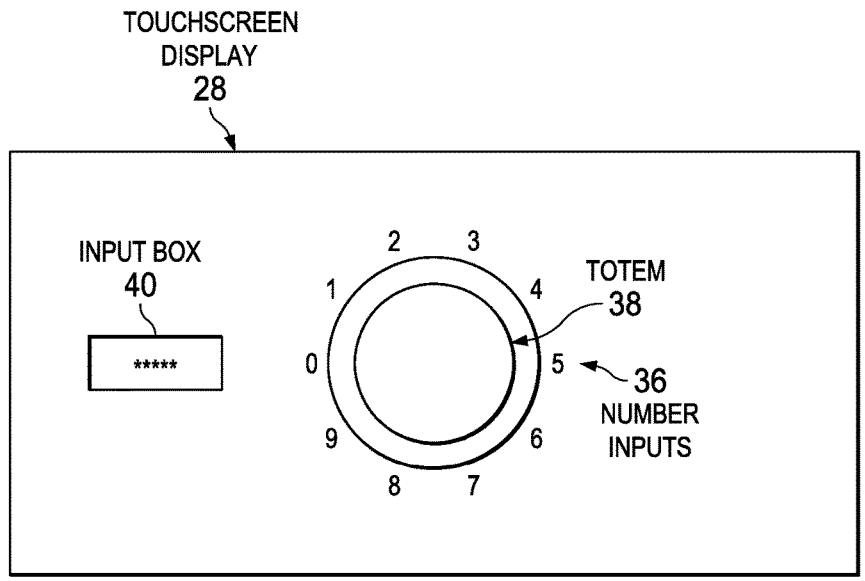
FIG. 2 depicts one example embodiment of totem security code value inputs by rotation of the totem on the display relative to numbers presented at the perimeter of the totem.

Referring now to FIG. 2, one example embodiment depicts totem security code value inputs by rotation of a totem 38 on display 28 relative to numbers 36 presented at the perimeter of the totem 38. In the example embodiment, a totem 38 placed on display 28 with a locked information handling system 10 automatically initiates presentation of a combination lock user interface 34 at the location of totem 38 having numbers 36 presented at the totem perimeter. If totem 38 includes a Bluetooth interface, the Bluetooth unique identifier may be applied to determine the user attempting to access information handling system 10 and/or the security code available for access. Security code input values are selected by rotating totem 38 relative to the numbers 36 and selecting input values based upon the relative rotational position of totem 38 upon detection of rotation in an opposite direction, such as by mimicking the inputs made at a physical combination lock. As input values are selected, the input values are placed in an input box 40 until the security code input is complete. Input box 40 provides an alternative input location to allow an end user to input the security code with a keyboard or other input device if desired, such as an external keyboard that will not leave marks on display 28. In various embodiments, totem 38 enhances security by randomizing how input values are selected with the interaction of totem 38, numbers 36 and user interface 34. For example, numbers 36 are presented in a random order or in a numerical order with a randomly selected number in the top position at each presentation. As another example, additional symbols may be included, such as letters or other symbols, which may or may not represent potential inputs so that a greater number of random inputs are available. As another example of an additional security measure, totem 38 may include a biometric security device, such as fingerprint reader, that adapts the security code used by security module 30. For example, if a positive fingerprint identification is made, a shortened security code may be selected for access by the end user and indicated by the size of input box 40.

Figure 3:
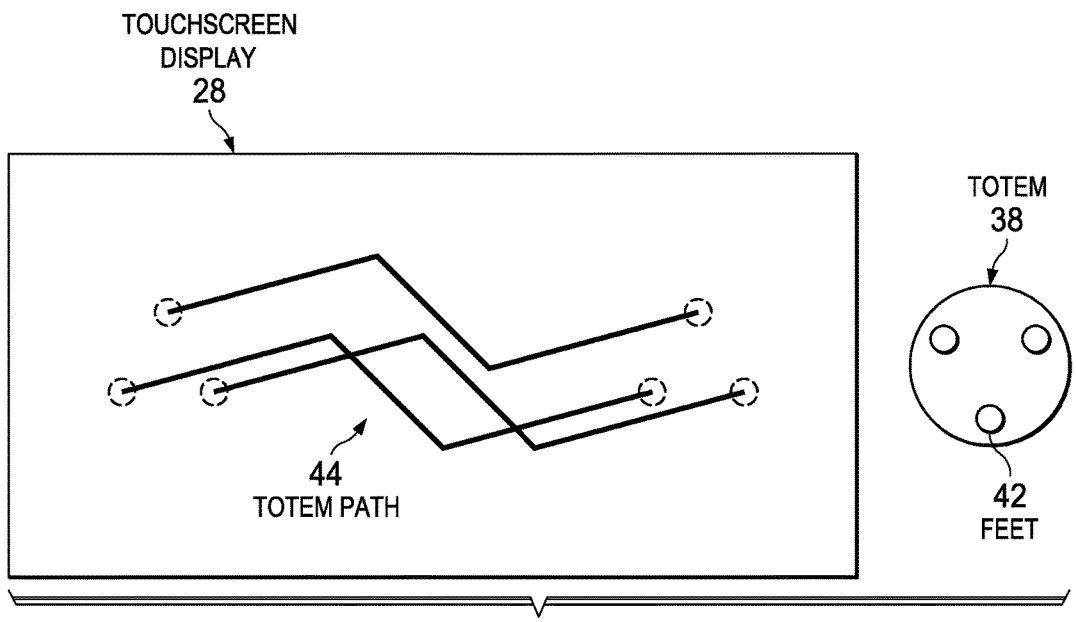
FIG. 3 depicts another example embodiment of totem security code value inputs by motion of the totem across the display to generate a secure totem path.

Referring now to FIG. 3, another example embodiment of totem security code value inputs by motion of the totem 38 across the display 28 to generate a secure totem path 44. Totem 38 has feet 42 that touch display 28 to provide a specific pattern, such as a pattern that identifies totem 38. In the example embodiment, totem path 44 provides an additional or alternative security code input that avoids placement of marks on display 28 that an unauthorized user can mimic. For example, totem path 44 is required by security module 30 in order to initiate presentation of a user interface for accepting a security code input.

Figure 4:
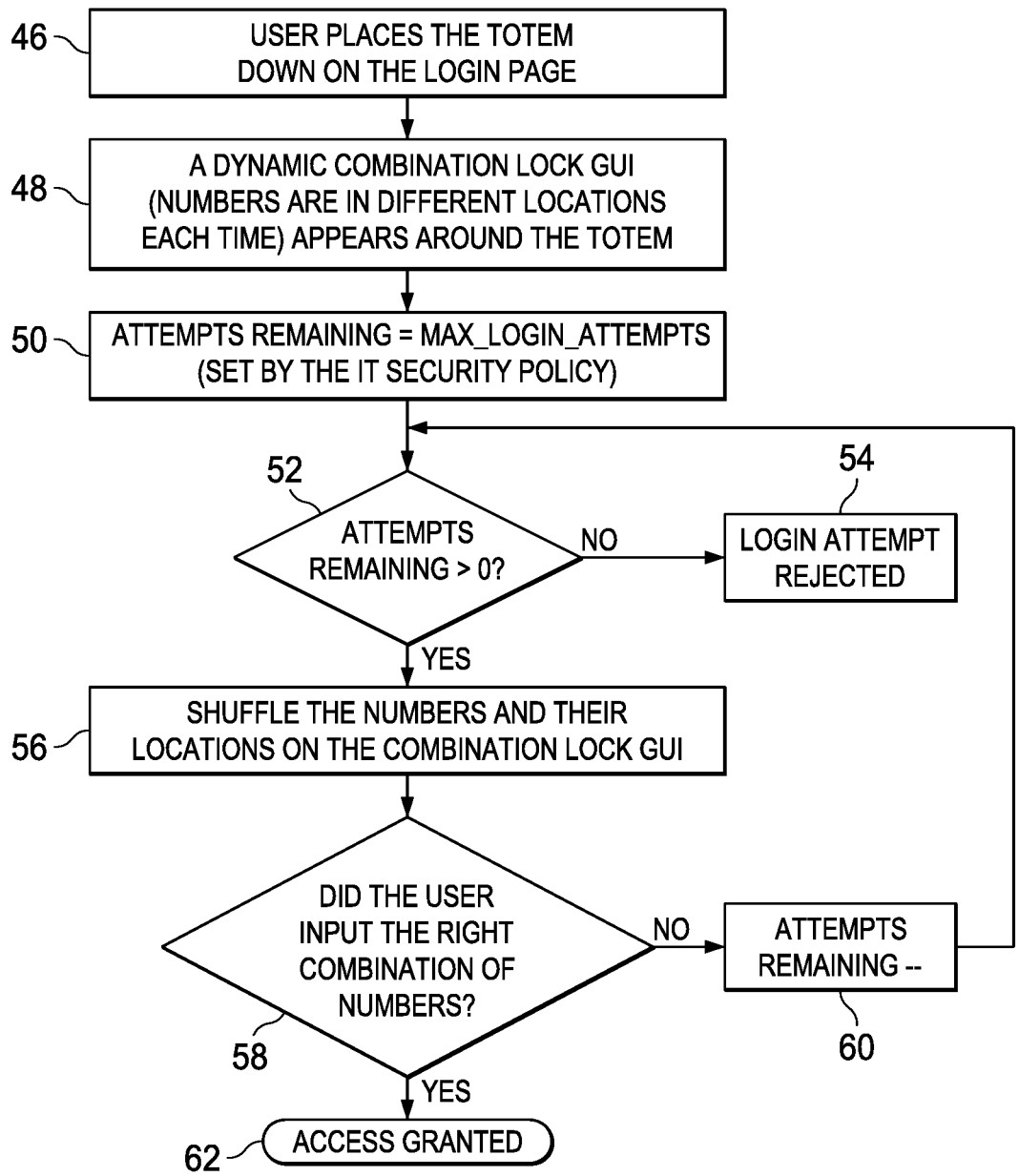
FIG. 4 depicts a flow diagram of a process for managing security code access with a totem combination lock user interface at an information handling system display.

Referring now to FIG. 4, a flow diagram depicts a process for managing security code access with a totem combination lock user interface at an information handling system display. The process starts at step 46 with placement by an end user of a totem on an information handling system display during presentation of a login page, such as an operating system welcome page or an application start page. At step 48, in response to detection of the totem, a dynamic combination lock graphical user interface is generated and presented at the display. At generation of the combination lock user interface, numbers are presented at the perimeter of the totem in a random manner, such as with the numbers in different locations relative to the top of the display or other display reference location. At step 50, the number of allowed access attempts is set to a maximum number and, at step 52 a determination is made of whether any access attempts by the end user are allowed. If not, the process ends at step 54 with the login attempt denied. If the end user has one or more access attempts remaining, the process continues to step 56 to shuffle the numbers and number locations presented at the combination lock user interface so that inputs of the correct values are provided at random locations. At step 58, a determination is made of whether the end user input a correct security code for access to the information handling system. If not, the process continues to step 60 to decrement the attempts remaining and to step 52 to allow another attempt if appropriate. If the correct security code input was made, the process ends at step 62 to grant the end user access.

Although the present invention has been described in detail, it should be understood that various changes, substitutions and alterations can be made hereto without departing from the spirit and scope of the invention as defined by the appended claims.

What is claimed is:
1. An information handling system comprising:
  a processor operable to execute instructions to generate visual information;
  a memory interfaced with the processor, the memory operable to store the information;
  a graphics processor interfaced with the processor and operable to process the visual information to generate pixel information, the pixel information defining visual images for presentation on the display;
  a display interfaced with the graphics processor and operable to present the visual images, the display having a touchscreen operable to detect touches;
  a controller interfaced with the display touchscreen and operable to interpret touches as inputs; and
  a non-transitory memory storing a security module having instructions that when executed on the controller generate a user interface presented on the display, the user interface having a perimeter, the perimeter having symbols disposed in a randomly selected of plural orders, the user interface accepting a security code input by movement of the user interface and the symbols relative to each other.

2. The information handling system of claim 1 further comprising:
  a totem disposed on the display, the controller operable to detect totem touches to determine totem rotational orientation; and
  a combination lock visual image presented at the user interface;
  wherein the symbols comprise numbers and the security code comprises a combination lock code input by rotation of the combination lock visual image.

3. The information handling system of claim 2 wherein the numbers are presented in numeric order around the perimeter and the plural orders comprise plural different numbers located at a top of the combination lock visual image.

4. The information handling system of claim 2 wherein the totem comprises plural feet in contact with the display, the security module selecting the order based at least in part on an orientation associated with the plural feet.

5. The information handling system of claim 2 wherein the totem includes a personal area network device having a unique identifier, the security code based at least in part upon the unique identifier.

6. The information handling system of claim 1 wherein the security module comprises access control to the information handling system operating system.

7. The information handling system of claim 1 wherein the security module comprises access control to an application executing over an operating system of the information handling system.

8. The information handling system of claim 2 further comprising a biometric identification system integrated in the totem and operable to communicate with the security module, the security module applying biometric information to determine the security code.

9. A method for securing an information handling system, the method comprising:
  presenting a user interface at a display of the information handling system, the user interface having symbols disposed around a perimeter, the symbols having an order randomly selected from plural orders;
  moving the user interface relative to the symbols to select plural of the symbols as a security code input to the information handling system; and
  authorizing access to the information handling system if the security code matches a security code of the information handling system.

10. The method of claim 9 further comprising:
  disposing a totem at the user interface; and
  moving the user interface relative to the symbols by rotating the totem.

11. The method of claim 10 further comprising:
  wirelessly communicating a unique identifier from the totem to the information handling system; and
  selecting the security code based at least in part upon the unique identifier.

12. The method of claim 10 wherein the user interface presents a combination lock visual image and the symbols comprise numbers.

13. The method of claim 12 wherein the symbol plural orders comprises the numbers presented in numerical order with a randomly-selected number in a top position.

14. The method of claim 9 further comprising a first security code associated with authorization of access to an operating system of the information handling system and a second security code associated with authorization of access to an application running over the operating system.

15. An information handling system security system comprising:
  a display operable to present visual images, the display having a touchscreen operable to detect touches;
  a controller interfaced with the display touchscreen and operable to interpret touches as inputs; and
  a non-transitory memory storing a security module having instructions that when executed on the controller generate a user interface presented at the display and having a perimeter, the perimeter having symbols disposed in a randomly selected of plural orders, the user interface accepting a security code input by movement of the user interface and the symbols relative to each other.

16. The information handling system security system of claim 15 wherein the user interface presents as a combination lock.

17. The information handling system security system of claim 15 wherein:
  the security module automatically presents the user interface in response to placement of a totem on the display; and
  rotation of the totem relative to the symbols provides the security code input.

18. The information handling system security system of claim 17 wherein a security code input value is selected based upon the relative position of the totem and perimeter at detection of rotation of the totem in an opposite direction.

19. The information handling system security system of claim 17 wherein the totem wirelessly transmits a unique identifier to the security module to authorize presentation of the user interface.

20. The information handling system security system of claim 19 wherein the security module sets the security code based at least in part upon the unique identifier.

* * * * *